United States Patent [19]

Hein

[11] Patent Number: 5,241,843
[45] Date of Patent: Sep. 7, 1993

[54] WATER SAVER FOR AUTOMATIC WASHER

[76] Inventor: Jack D. Hein, 14004 Ariee Pl., Sylmar, Calif. 91342

[21] Appl. No.: 821,589

[22] Filed: Jan. 16, 1992

[51] Int. Cl.$^5$ .............................. D06F 39/08
[52] U.S. Cl. ............................ 68/3 R; 68/17 R; 68/207; 68/902
[58] Field of Search .......... 68/207, 208, 902, 17 R, 68/3 R

[56] References Cited

U.S. PATENT DOCUMENTS

| | | | |
|---|---|---|---|
| 2,287,927 | 6/1942 | Altorfer | 68/902 X |
| 2,588,774 | 3/1952 | Smith | 68/902 X |
| 2,931,200 | 4/1960 | Schell et al. | 68/208 X |
| 2,946,212 | 7/1960 | Houser | 68/208 X |
| 4,186,770 | 2/1980 | Zijlstra | 68/902 X |
| 4,441,340 | 4/1984 | Kaplan | 68/207 X |

FOREIGN PATENT DOCUMENTS

| | | | |
|---|---|---|---|
| 59-131392 | 7/1984 | Japan | 68/902 |
| 63-64236 | 12/1988 | Japan | 68/207 |

Primary Examiner—Frankie L. Stinson
Attorney, Agent, or Firm—Albert O. Cota

[57] ABSTRACT

A water saver for an automatic washer which has a wash and rinse water storage tank (34) and (54) attached directly onto each side of the washer (18). A two-way solenoid valve (42) along with hot and cold water solenoid valves (44) and (62) allow fresh water to be introduced into the tanks. Wash water and rinse water pumps (52) and (68) cause the water from the tanks to flow into the washer through the water mixing valve (24) upon demand of the washer controls. Suds and rinse water are returned to the respective tanks through solenoid valves (48) and (60) upon completion of the washer cycle. Succeeding loads of laundry are washed by the water stored in the tanks using the same valves and pumps employed for the initial water filling. When the last load is completed, the water from the tanks is drained into the building waste drain using the wash and rinse water pumps (52) and (68) in conjunction with a drain solenoid valve (70) forcing the water to flow into the drain.

12 Claims, 6 Drawing Sheets

WATER SAVER FOR AUTOMATIC WASHER

TECHNICAL FIELD

The present invention relates to automatic washing machines in general. More specifically to a water saver having a pair of tanks attached to the washer for storing suds and rinse water for reuse during succeeding laundry cycles.

BACKGROUND ART

Previously, many types of systems have been used in endeavoring to provide an effective means for saving and reusing suds water to reduce the expense of washing using automatic washers. In most cases, the storage container is a conventional reservoir, sink or laundry tub, however, one invention uses a single storage tank inside the washing machine itself.

A search of the prior art did not disclose any patents that read directly on the claims of the instant invention however, the following U.S. patents were considered related:

| U.S. PAT. NO. | INVENTOR | ISSUED |
| --- | --- | --- |
| 4,624,118 | Yamakawa, et al | 25 November 1986 |
| 4,495,960 | Cartier, et al | 29 January 1985 |
| 3,965,291 | Sims | 3 October 1972 |
| 2,924,959 | Israel, Jr. | 16 February 1960 |
| 2,920,469 | Henshaw, Jr. | 12 January 1960 |
| 2,894,384 | Smith | 14 July 1959 |
| 2,884,947 | Gerhardt | 5 May 1959 |

Yamakawa et al in U.S. Pat. No. 4,624,118 teach a washing machine with a water store tank that serves as both a washing tank and a water extraction tank. The purpose of the tank is to soak washing products for a predetermined period of time in the washing tank and then transferring the water to the storage tank where the laundry has the water extracted and the water is returned for additional washing prior to draining.

U.S. Pat. No. 4,495,960 issued to Cartier, et al is for a suds return valve in which a flapper valve is employed that may be manually set to save suds water for subsequent use. The valve automatically returns the flow to the drain when a predetermined level has been reached in the sink or tub used for storage. The valve is manually set to reuse the suds water and then directs the flow to the drain.

Sims provides an automatic washer that includes a suds saving mode of operation in U.S. Pat. No. 3,695,291. This invention permits the wash water to be pumped into a supplementary laundry tub for later reuse. A purge action clears the hose to the tub by pumping rinse water for a short period of time preventing air lock in the pump.

Israel Jr. uses a pump system which is capable of selectively pumping a fluid from any one of a number of sources to selected discharge locations in U.S. Pat. No. 2,924,959. The pump system also has a filtering arrangement to remove lint and foreign matter during the washing operation.

U.S. Pat. No. 2,920,469 of Henshaw, Jr. employs a suds saver system to reuse wash water that has been saved in an adjacent storage reservoir such as a common household tub set. A separate return pump is used to pass the water back into the washer. The invention includes an improved electrical control system within the washer to accomplish this feature.

Smith in U.S. Pat. No. 2,894,384 also teaches a suds saving control system for a washing machine. This invention however, is for a control system using a reversible motor for the pump effecting centrifugal extraction of the water from the storage container requiring only a single reversible pump for complete operation.

Finally, U.S. Pat. No. 2,884,947 of Gerhardt discloses a washing machine where wash water may be pumped back into the machine for subsequent operation. This invention includes an arrangement whereby a pump is employed that has means to keep a prime allowing operation at any time. Further, tap water and sudsy water are supplied to the machine through a common inlet.

It will be noted that while the use of saving the suds water in an auxiliary tank is disclosed commonly within the above prior art, and has been in use even prior to fully automatic washers, no disclosure has been directed to saving rinse water as well.

DISCLOSURE OF THE INVENTION

Saving soap in wash water is economically and environmently feasible as it not only conserves energy to heat the water but also the expense of the soap itself. Some areas and seasons find water at a premium and laundering clothing consumes large volumes and is consistently in demand. Also, septic tanks and cess pools are limited in their capability to receive large quantities of water especially suds water common to washer discharge. It is therefore a primary object of the invention to integrate both water, energy and cleaning substance conservation as an integral part of the washer itself. In today's modern dwellings, the use of auxiliary sinks or laundry tubs has not been popular nor has importance been given to such a device as present automatic washers are completely self contained and do not require auxiliary reservoirs as in the past. Therefore this combined utility has been lacking and the instant invention completely fills this need.

An important object of the invention is the ability of the apparatus to be adapted to both the original equipment manufacturer or to be added in the aftermarket as a kit. Since the device matches the configuration of the washer on each side and is integrated in the electrical system, it is simple to increase the product line to incorporate this invention as an accessory or option by the manufacturer.

Another object is directed to the simplicity of adding the device by the owner as an aftermarket kit requiring no modification to the structure of the washing machine. The tanks are attached to the sides and bottom using novel clips and the piping is simply screwed into or clamped over the existing fittings as in an ordinary installation. Only five wires have to be brought from the inside of the washer and connected to the invention in typical washers. Also the location and connection of the wires and hoses is easily understood even by the layman. Obviously, the kit must match the particular make and model however, most modern washers are similar in construction and even appearance.

Still another object of the invention permits the user to select the number of loads of laundry to reuse the suds and rinse water as the manual operation of a single switch drains the stored water. Subsequent use automatically refills the tanks when needed. This feature allows the user the choice of when to drain the water and yet it is not necessary to reset the unit for each load of laundry.

Yet another object of the invention is to provide an asthetic pleasing appearance to the washer. The tanks are mounted one on each side of the washer which balance and maintain symmetry of appearance for the appliance. Hidden clips and brackets attach the tanks with no physical modification necessary and the color, shape and distinguishing characteristics are duplicated with each model of automatic washer and even a generic size may be provided to fit a number of models. The piping required to attach to the washer is all self contained and is simply fastened to the rear of the washer out of sight.

A final object of the invention is the simplicity of operation as the electrical modification to the washer, attaches only the necessary wires, leaving the washer completely automatic requiring no special instructions or consideration during use. The only choice necessary is when to dump the water saved in the tanks which is in reality dependent upon the material being laundered and the amount of soiled clothing in each load along with the individual desires of the user. Only one switch is required and it is remotely located above one of the tanks which is easy to reach and does not cause confusion to the already balanced design of the control panel.

These and other objects and advantages of the present invention will become apparent from the subsequent detailed description of the preferred embodiment and the claims taken in conjunction with the accompanying drawings.

BEST MODE FOR CARRYING OUT THE INVENTION

The preferred embodiment as shown in FIGS. 1–12 is comprised of an automatic washer 18 that incorporates the following major elements: a pump 20, a water mixing valve 24, a wig-wag 30 and a control timer switch 32. The invention requires interface with these or similar elements to function properly with the water. Other internal elements that perform the same functions may be alternatively employed not limiting the invention to the devices outlined above.

The invention can be added, by either the original equipment manufacturer or the owner at a later date. The wash water storage means consists of a wash water tank 34 that is attached with clips 35 and brackets 37 to one side of the washer 18. The clips 35 and brackets 37 shown in FIG. 10 allow attachment without modification to the washer 18. This tank 34 is basically the same size in height and width as the washer 18 illustrated in FIGS. 1 and 4, thus being compatible in overall appearance. Baffles 36 are included inside the tank 34 to settle the bubbles formed during the filling process. Inlet and outlet fittings 38 are also incorporated in tank 34 and compartment 40 with access openings 41 is positioned in the bottom rear to house pumping apparatus to drain the tank. The tank 34 may be made of any material however, steel is preferable with a ceramic coating duplicating that of the washer.

Wash water introduction and water level control means brings hot water into the tank 34. The wash water is pumped out of tank 34 to washer tub 22 by pump 52 connected to water mixing valve 24 filling tub 22 to a predetermined level when the washer control timer switch 32 is energized at the start of the wash cycle. A two-way solenoid valve 42, a tank hot water solenoid valve 44, water mixing valve 24 and a water level switch 26 are used to accomplish this function. Hot water may actually be a mixture of hot and cold according to the temperature set with the washer controls however, for clarity sake, it will hereafter be referred to as hot water. The two-way solenoid valve 42 receives both hot and cold pressurized water from the building facilities as would the water mixing valve 24 on the washer and is controlled in the same manner by the washer temperature selector switch 28. The two-way solenoid valve 42 has two inlets and one outlet and is piped directly to the tank 34 when both valves are in the open position and pump 52 is energized. Water continues to flow until the washer level water control switch 26 senses the water level and switches from water fill mode to wash mode and de-energizes solenoid valve 44 and two-way solenoid valve 42 providing the necessart water to fill the washer tub 22.

Wash water transfer means conveys the subs water from the washer to tank 34 after a load of laundry has been through the wash cycle. This transfer consists of a suds water solenoid valve 48 connected to the wash water tank 34 on one end of a hose 82 and to the pumping system of the washer through the washer outlet 50 on the other. After tank 34 is filled by wash water from tub 22, wash water level switch 46 switches, de-energizing tank hot water solenoid valve 44 and suds water solenoid valve 48 and energizes rinse water solenoid valve 60 preventing wash water from two-way solenoid valve 42 from entering wash water tank 34 on subsequent wash loads. Wash water delivery means delivers the suds water previously saved in tank 34 to the washer water mixing valve 24 when a load has been completely laundered and removed from the washer and a subsequent laundering cycle has begun. A wash water pump 52 is positioned within a compartment 40 in tank 34 connected to one of the fittings 38 on the inlet side. The pump 52 includes an internal pressure switch that automatically de-energizes the pump when the mixing valve 24 on washer closes indicating the level within the washer is satisfied as sensed by the washer water level switch 26.

Figure 1:
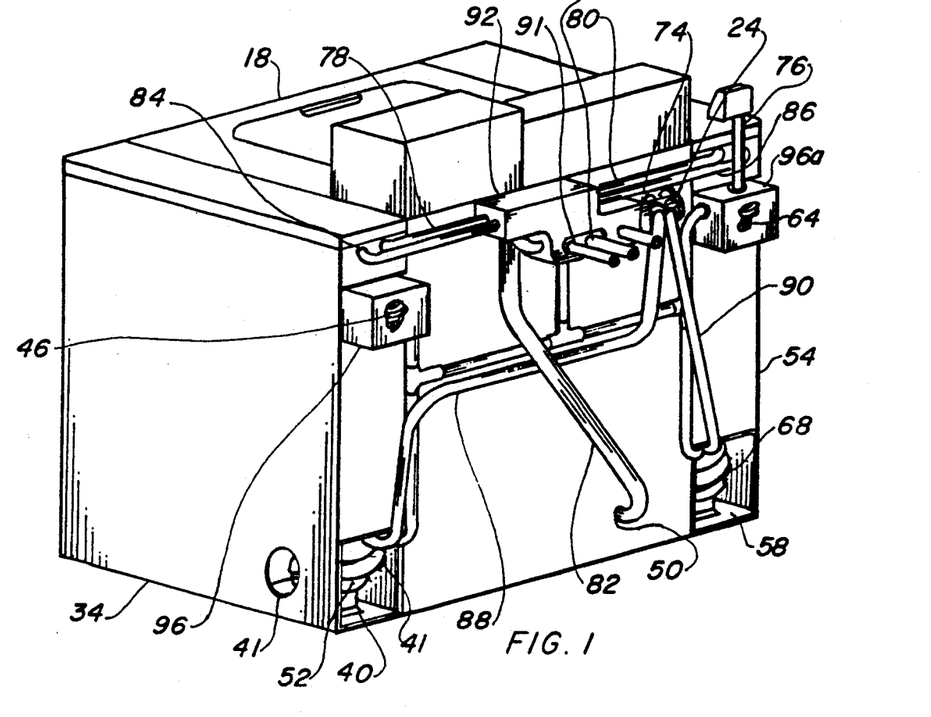
FIG. 1 is a partial isometric view of the preferred embodiment viewed from the back of the washer.
Figure 2:
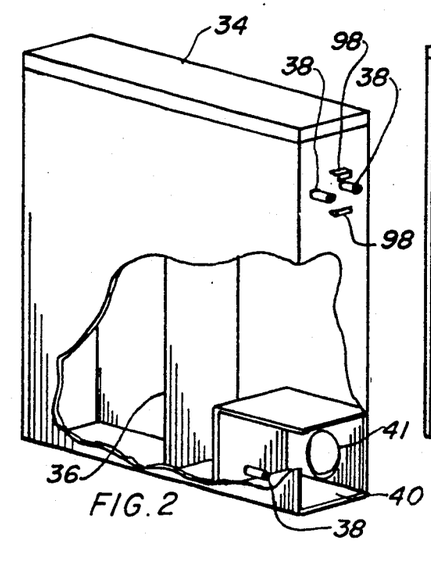
FIG. 2 is a partial isometric view of the bare suds water tank completely removed from the invention for clarity. The view has been partially cut away to illustrate the elements inside the tank.
Figure 4:
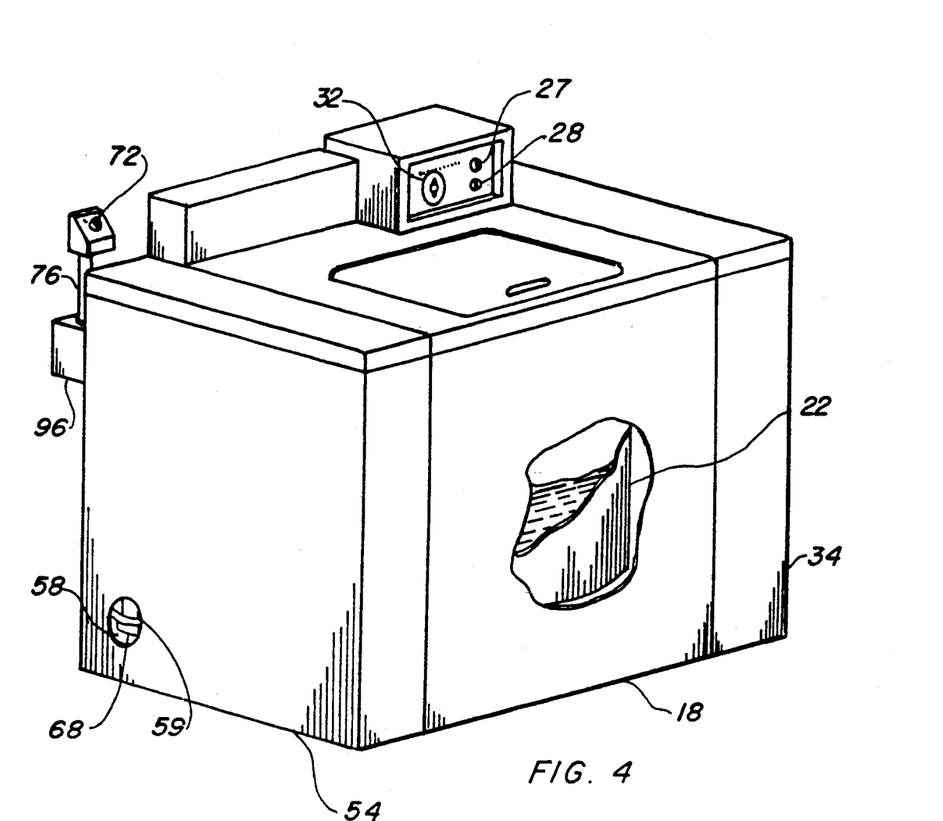
FIG. 4 is a partial isometric view of the preferred embodiment viewed from the front partially cut away to illustrate the tub inside the washer.

The rinse water system is basically a duplicate of the wash water system except the rinse water tank 54 is a mirror image and is installed on the opposite side of the washer as illustrated in FIGS. 1 and 4. inlet and outlet fittings 56 and a compartment 58 with access openings 59 are also similarly included and the method of attachment with clips 35a and brackets 37a in mirror image remains identical except opposite.

Rinse water introduction and level control means brings cold water or mixed temperature water into the rinse water tank 54 and rinse water pump 68 fills the washer tub 22 initially to a predetermined level when the washer control timer switch 32 is energized at the beginning of the rinse cycle. The two-way solenoid valve 42 and tank cold water solenoid valve 62 and washer water level control switch 26 are used to accomplish this function. The two-way solenoid valve 42 receives both hot and cold pressurized water from the building facilities as would the mixing valve 24 on the washer, and is controlled in the same manner by the temperature selector 28 as previously described. The two-way solenoid valve 42 is piped directly to the cold water solenoid valve 62 allowing water to enter the tank 54 when both valves are in the open position. Cold water continues to flow until the water level switch 26 senses the water level and de-energizes the cold water solenoid valve 62 and two-way solenoid valve 42 providing the necessary water to fill the washer tub 22. Rinse water transfer means conveys the rinse water from the washer to the tank 54 after a load of laundry has been through the rinse cycle. This means consists of the rinse water valve 60 connected to one of the fittings 56 on the rinse water tank 54 through rinse water discharge hose 86, and by washer discharge hose 82 connected to the inlet side of solenoid valve 60 on one end and washer outlet 50 on the other.

After rinse water tank 54 is filled with rinse water from washer tub 22, rinse water level switch 64 de-energizes cold water solenoid valve 62, and as long as tank 54 is full of rinse water, no additional rinse water from two-way solenoid valve 42 can enter the tank 54 on subsequent washer loads.

Rinse water delivery means delivers the rinse water previously saved in the tank 54 to the washer mixing valve 24 when a load has been completely laundered and removed from the washer and a subsequent laundering cycle has begun. A rinse water pump 68 is positioned within a compartment 58 in the tank 54 connected to one of the fittings 56 on the inlet side. The pump 68 includes an integral pressure switch that automatically de-energizes the pump when the mixing valve 24 on the washer closes indicating the level within the washer is satisfied as sensed by the washer water level switch 26.

Figure 3:
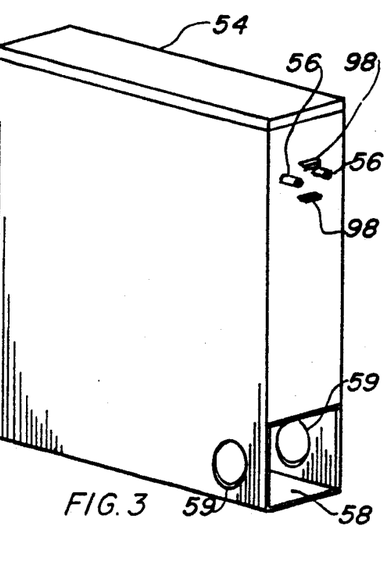
FIG. 3 is a partial isometric view of the bare rinse waster tank completely removed from the invention for clarity.

Drain means expel the suds water and rinse water from the water saver when the washer operation is completed and consists of a drain solenoid 70 and a drain switch 72. The drain solenoid 70 is attached to an external waste conduit 74 normally of a molded rubber like material the same as used on a conventional automatic washer. The drain switch 72 is electrically connected to the drain solenoid valve 70 and subsequently pumps 52 to 68 permitting the operator to drain the system at the conclusion of the washer's operation or at any time desired. The drain switch 72 is preferably mounted on a pedistal 76 extending above the rinse tank 54 as illustrated in FIGS. 1, 4, 5 and 10 for the aftermarket configuration. The switch may also be incorporated into the control panel near the control timer switch 32 for the original equipment configuration. A safety overflow switch 69 is installed in the rinse water tank 54 near the top as illustrated in FIG. 3 and functions to start the rinse water pump 68 and drain solenoid 70 in the event that the rinse water tank 54 becomes overfilled during the rinse cycle of the washer 18.

The unit is so wired as to allow a rinse cycle after the completed wash cycle and during the spin cycle before the complete rinse cycle, and during spin cycle as directed by the washer control switch 32.

The washer functions are in full control at all times from first washer load through all subsequent washer loads.

Figure 11:
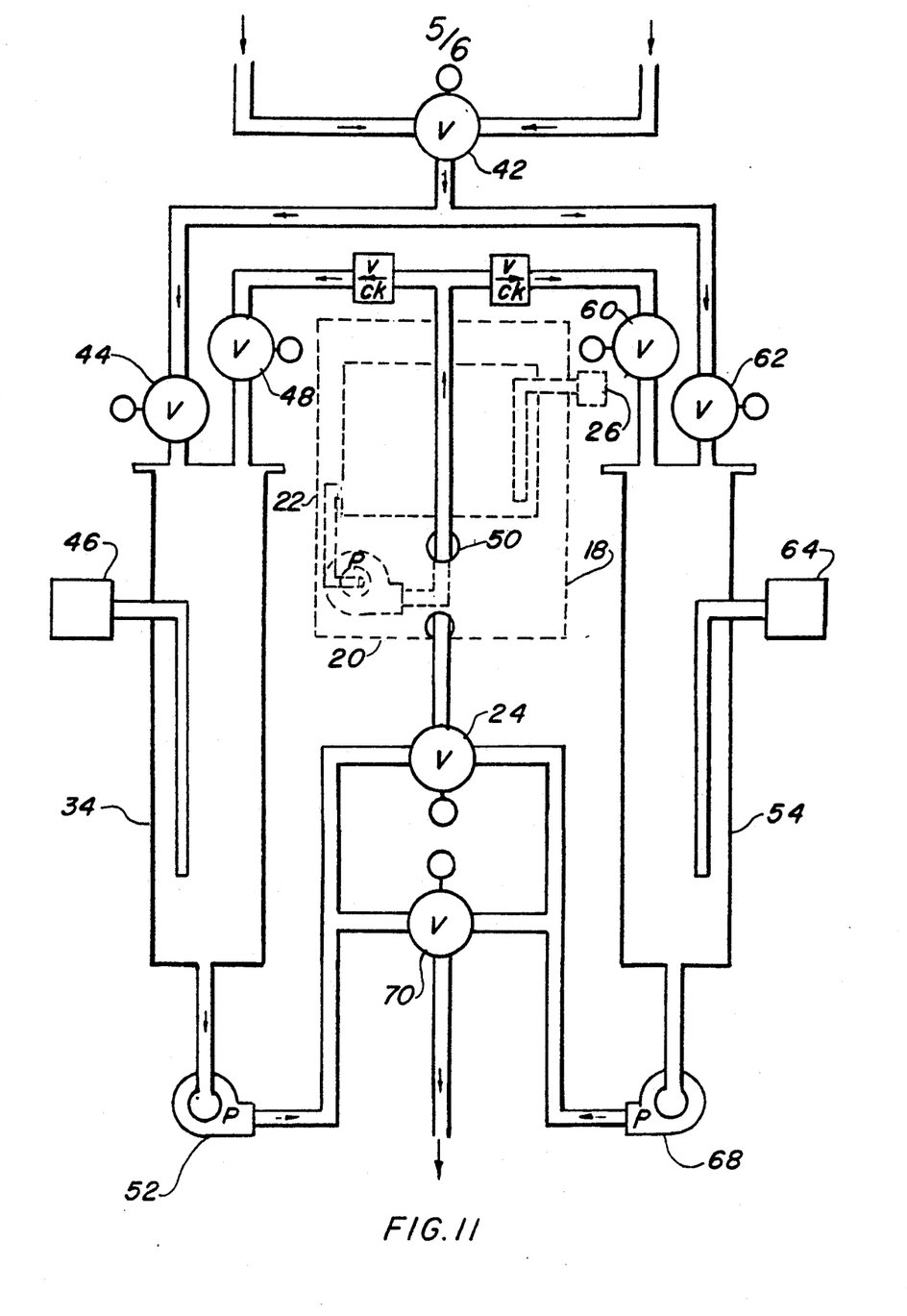
FIG. 11 is a piping schematic of the water saver.
Figure 12:
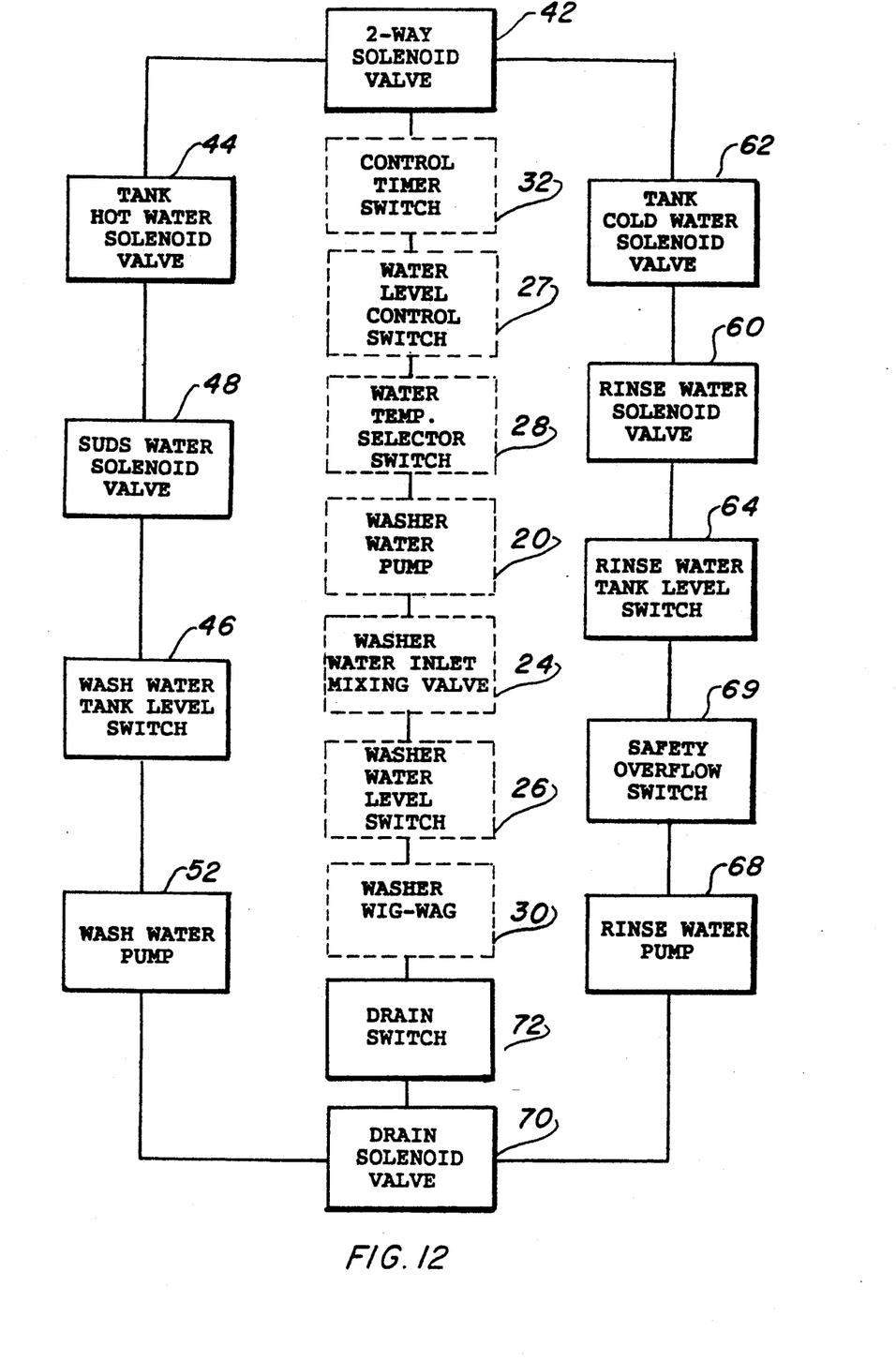
FIG. 12 is an electrical block diagram of the water saver.

The piping arrangement attaching the various components together is schematically illustrated in FIG. 11 and pictorially depicted in FIG. 1. It is preferred that in the aftermarket configuration, the lines are flexible hoses of synthetic rubber or the like, well known in the art, or in the original equipment, a combination of rigid tubing and flexible hoses may be used with equal utility. The communication between the water level switch 46 and the hot water valve 44 and suds water valve 48 consists of an electrical connection to de-energize said valves. The cold water valve 62 to the rinse tank 54 uses a cold water supply hose 80. A washer discharge hose 82 connects the outlet of the washer to the manifold suds water and rinse water solenoid valves 48 and 60. Connection on to the tanks consists of a suds water discharge hose 84 and a rinse water discharge hose 86. The wash water pump hose 88 and the rinse water hose 90 connect the pumps to washer mixing valve 24. The building hot water hose 91 and building cold water hose 93 are of the type normally furnished for automatic washers of this type.

Figure 6:
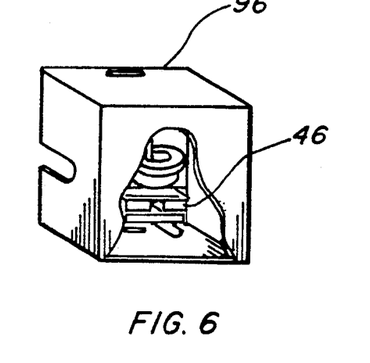
FIG. 6 is a partial view of the level switch and cover and drain switch completely removed from the invention for clarity.
Figure 7:
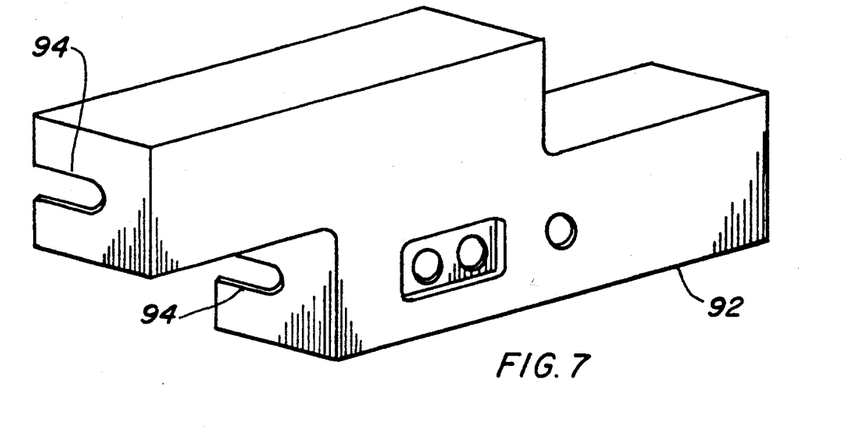
FIG. 7 is a front isometric view of the valve and piping cover completely removed from the invention for clarity.
Figure 8:
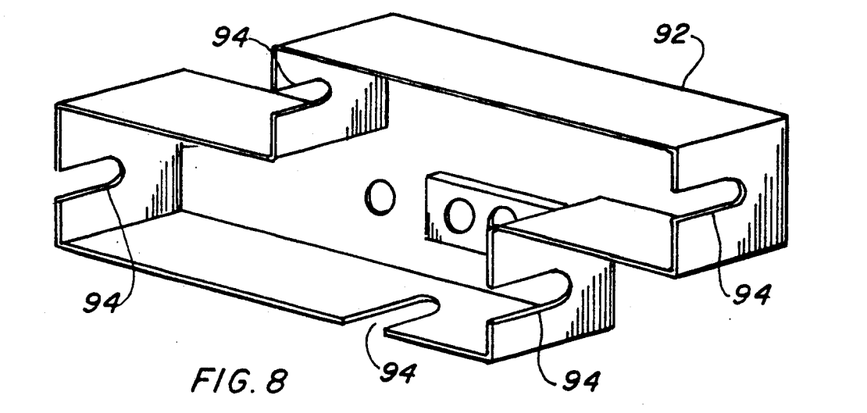
FIG. 8 is a rear isometric view of the valve and piping cover completely removed from the invention for clarity.
Figure 9:
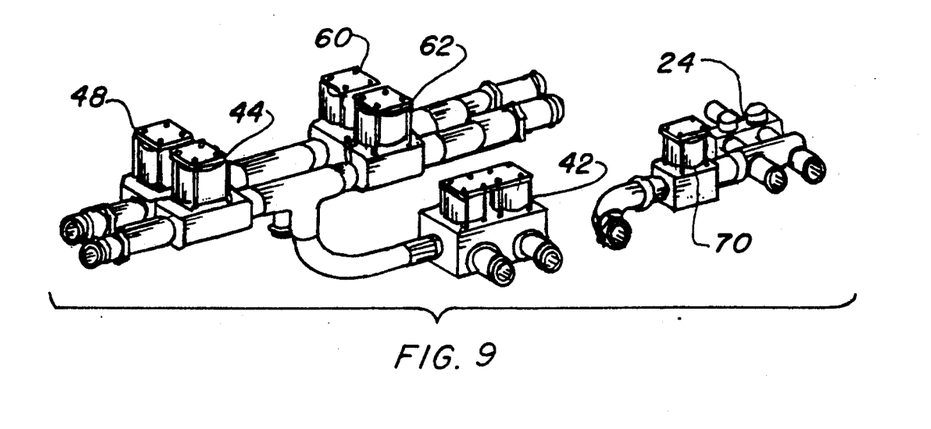
FIG. 9 is a isometric view of the valve and piping assembly completely removed from the invention for clarity.
Figure 10:
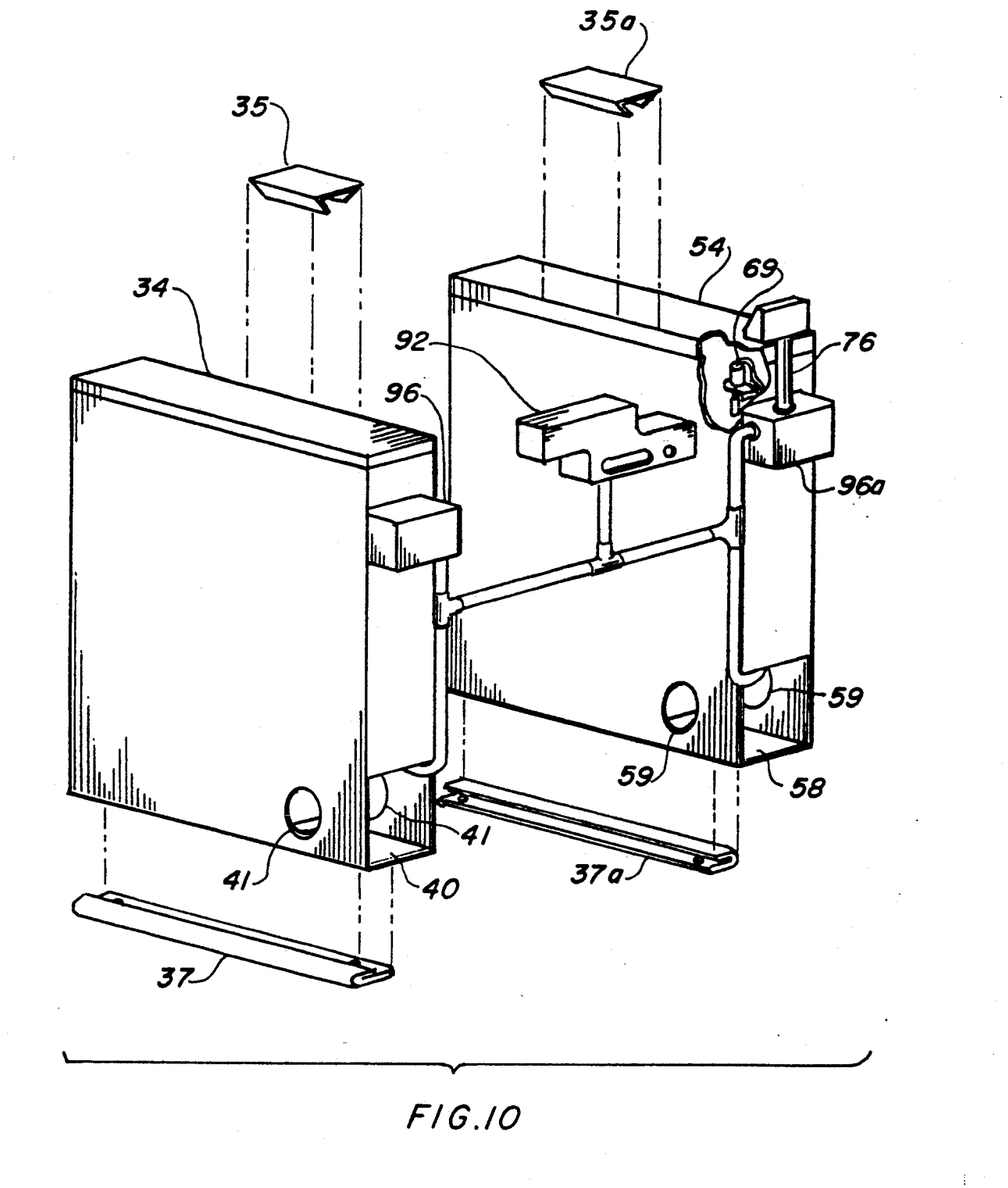
FIG. 10 is a partial exploded view of the electrical conduit assembly and mounting brackets less the washer.

A valve assembly cover 92 illustrated in FIGS. 1, 7 and 8 encloses the valves and protects the electrical wiring to the solenoid coils, this cover 92 may be of any material or construction however, vacuum molded thermoplastic is preferred. The opening for piping consists of slots 94 allowing removal from the back of the washer without effecting the piping arrangement. Level switch covers 96 and 96a, shown in FIGS. 1, 2, and 3 and separately in FIGS. 5 and 6 are similar in construction and material and are attached with clasps 98 to the tanks 34 and 54.

Figure 5:
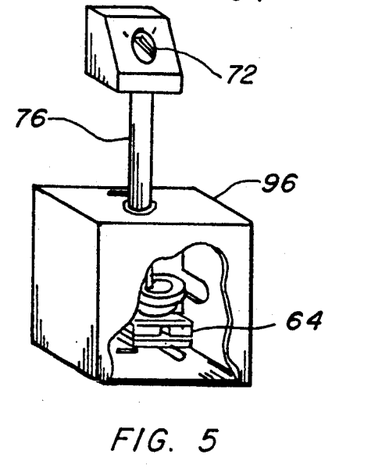
FIG. 5 is a partial view of the level switch, cover completely removed from the invention for clarity.

The electrical interconnection between the switches and solenoid valves is illustrated in block diagram FIG. 5. The actual wire to wire circuitry may change depending upon the individual washer however, the relationship remains the same and its function is described in the following sequence of operation.

Laundry and detergent are placed in the washer and the water temperature and the water level is selected with the appropriate switches 27 and 28. The control timer switch 32 is set to the desired wash cycle which opens two-way, hot water and suds water solenoid valves 42, 44 and 24 and energizes the wash water pump 52 permitting hot water or a mix of hot and cold water to enter the tank 34 and be pumped into washer tub 22. Washer level switch 26 controls the water level within the washer tub 22 and de-energizes mixing valve 24 and operates the integral pressure switch within the pump 52 de-energizing the pump motor when the washer level switch 26 is satisfied.

At the end of the wash cycle the wig-wag 30 in the washer directs the washer pump 20 to drain the suds water and simultaneously the suds water valve 48 opens allowing the suds water to be pumped into the wash water tank 34 where it remains until needed.

The rinse cycle of the washer then begins and the control timer switch 32 energizes the two-way solenoid valve 42 along with cold water solenoid valve 62, water mixing valve 42 and energizing rinse water pump 68 permitting the fresh cold, or mixed temperature water, to enter washer tub 22. As with the hot water cycle, the level switch 26 controls the water level within the washer tub 22 and when the level within the tub 22 of the washer 18 is satisfied, the washer level switch 26 switches from water fill mode to wash mode and de-energizes solenoid valves 42 and 24 allowing the pressure switch in the pump 68 to deactivate the pump as pressure is built up by dead-heading the pump discharge flowpath.

Washer operation continues, and at the conclusion of the rinse cycle, wig-wag 30 activates pump 20 (rinse water solenoid valve 60 was energized when wash water tank level switch 64 was energized by the filling of wash water tank 34 with suds water). The rinse water is then pumped into the rinse water tank 54 turning off water level switch 64 de-energizing cold water solenoid valve 62. The washer 18 then continues through the spin dry cycle and turns off where the first washer load is then completed and the laundry is removed.

The successive loads of laundry follow basically the same operational cycle except the hot or cold water from the external source is used only as make up water to maintain the level within the tanks instead of supplying all of the water for the washer as in the first cycle. A safety overflow switch 69 in the rinse water tank 54 prevents overfilling of the tank by operating the rinse pump 68 and actuating the drain solenoid valve 70 pumping the excess water into the drain if the washer overfills the tank.

Any number of loads may be washed using the suds and rinse water stored however, when the last load is completed, the water form both tanks 34 and 54 is finally drained manually actuating drain switch 72 located above one of the tanks. This emptying procedure is accomplished by energizing both pumps 52 and 68 and opening the drain solenoid valve 70 allowing the combined water to drain to the building waste drain through external conduit 74. The pumps 52 and 68 operate for a predetermined period of time, preferably five minutes, as determined by the drain switch 72.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the claims.

I claim:

1. A water saver for an automatic washer that includes a water mixing valve, a water level switch, a water pump, a water temperature selector switch, a wig-wag and a control timer switch, the water saver comprising:
   a) wash water storage means attached contiguously to a side of said washer,
   b) wash water introduction and level control means in fluid communication with said wash water storage means for bringing hot water therewithin from an outside pressurized water source to initially fill the washer upon demand of the control timer switch,
   c) wash water transfer means in intimate communication with both the washer and the wash water storage means, for conveying suds water therebetween after a load of laundry has been through a wash cycle,
   d) wash water delivery means between the storage means and the washer mixing valve for relocating previously saved wash water to the washer when a load has been completely laundered and removed from the washer and a succeeding laundering cycle has begun,
   e) rinse water storage means affixed to the washer on a side opposite the wash water storage means,
   f) rinse water introduction and level control means in fluid communication with said rinse water storage means for bringing cold water therewithin from an outside pressurized water source to initially fill the washer during a rinse cycle upon demand of the control timer switch,
   g) rinse water transfer means connected to the washer and rinse water storage means for conveying rinse water therebetween after a load of laundry has been through a rinse cycle,
   h) rinse water delivery means between the storage means and the washer mixing valve for relocating previously saved rinse water to the washer when a load has been completely laundered and removed from the washer and a succeeding laundering cycle has begun,
   i) drain means joined with both storage means and an external waste conduit for expelling both suds water and rinse water from the water saver upon completion of the washer's operation,
   j) a mounting clip in a shape compatible with an upper surface of said washer such that the clip secures the wash and rinse water storage means to the washer without physical modification thereof, and
   k) a mounting bracket in a shape compatible with a lower surface of said washer such that the bracket secures the wash and rinse water storage means to the washer without physical modification thereof.

2. The water saver as recited in claim 1 wherein said wash water storage means further comprises a wash water tank having baffles and a plurality of fluid fittings, of a shape compatible with the washer upon which it is attached.

3. The water saver as recited in claim 1 wherein said wash water introduction and level control means further comprise:
   a) a two-way solenoid valve having a first inlet and a second inlet and a single outlet for electrically controlling the flow of hot water from an outside source of water in a selected flowpath,
   b) a tank hot water solenoid valve connected to said wash water storage means and in fluid communication with the outlet of the two way solenoid valve for initially filling the storage means with hot water, and c) a wash water tank level switch attached to the wash water storage means with a pressure sensing tube therewithin for sensing the level of hot water and electrically de-energizing the hot water solenoid valve when the level has risen to a predetermined height.

4. The water saver as recited in claim 1 wherein said wash water transfer means further comprise:
a) a suds water solenoid valve connected to the wash water storage means for controlling the flow of suds water therethrough, and
b) a suds water hose connected to a drain discharge fitting of the washer on one end and the suds water solenoid valve on the other for conveying suds water from the washer to the storage means when discharged by the washer.

5. The water saver as recited in claim 1 wherein said wash water delivery means further comprises:
a) a wash water pump having an integral cut-off pressure switch fluidally connected to said storage means, and
b) a wash water hose connected to a water inlet mixing valve on said washer permitting said delivery of the wash water with the pump de-energized by the pressure switch when the level of water within the washer is satisfied.

6. The water saver as recited in claim 1 wherein said rinse water storage means further comprises a rinse water, tank having baffles and a plurality of fluid fittings, of a shape compatible with the washer upon which it is attached.

7. The water saver as recited in claim 1 wherein said rinse water introduction and level control means further comprise:
a) a two-way solenoid valve having a first inlet and a second inlet and a single outlet for electrically controlling the flow of cold water from an outside source of water in a selected flowpath,
b) a tank cold water solenoid valve connected to said rinse water storage means and in fluid communication with the outlet of the two-way solenoid valve for initially filling the storage means with cold water, and c) a rinse water tank level switch attached to the rinse water storage means with a pressure sensing tube therewithin for sensing the level of cold water and electrically de-energizing the cold water solenoid valve and the two-way solenoid valve when the level has risen to a predetermined height.

8. The water saver as recited in claim 1 wherein said rinse water transfer means further comprises:
a) a rinse water solenoid valve connected to the rinse water storage means for controlling the flow of rinse water therethrough, and
b) a rinse water hose connected to a drain discharge fitting of the washer on one end and the rinse water solenoid valve on the other for conveying rinse water from the washer to the storage means, when discharged by the washer.

9. The water saver as recited in claim 1 wherein said rinse water delivery means further comprises:
a) a rinse water pump having an integral cut-off pressure switch fluidally connected to said storage means, and
b) a rinse water hose connected to a water inlet mixing valve on said washer permitting said delivery of the rinse water with the pump de-energized by the pressure switch when the level of water within the washer is satisfied.

10. The water saver as recited in claim 1 wherein said drain means further comprises:
a) a drain solenoid valve in fluid communication with said external waste conduit permitting waste water to flow from the water saver, and
b) a drain switch electrically connected to said drain solenoid valve to permit an operator to actuate the drain at the conclusion of the washer's operation.

11. The water saver as recited in claim 1 further comprising a safety overflow switch disposed within said rinse water storage means electrically communicating with said drain means to dump excessive rinse water from the rinse water storage means in the event a disproportionate amount of rinse water enters the storage means from the washer during a rinse cycle.

12. The water saver as recited in claim 1 further comprising an automatic washer having integral controls eliminating the necessity of electrical modification.

* * * * *